United States Patent
Li et al.

(10) Patent No.: US 7,907,677 B2
(45) Date of Patent: Mar. 15, 2011

(54) OPEN LOOP MU-MIMO

(75) Inventors: Guangjie Li, Beijing (CN); Xiaoxin Wu, Beijing (CN); Zhangyong Ma, Beijing (CN); Yang Gao, Beijing (CN); Feng Zhou, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 11/864,932

(22) Filed: Sep. 29, 2007

(65) Prior Publication Data
US 2009/0041148 A1 Feb. 12, 2009

Related U.S. Application Data

(60) Provisional application No. 60/955,155, filed on Aug. 10, 2007.

(51) Int. Cl.
*H04B 7/02* (2006.01)

(52) U.S. Cl. ........ 375/267; 375/299; 375/341; 375/347; 375/349; 375/135; 375/136; 375/146; 375/147

(58) Field of Classification Search ................. 375/267, 375/299, 341, 347, 349, 135, 136, 146, 147
See application file for complete search history.

(56) References Cited

U.S. PATENT DOCUMENTS

| | | | |
|---|---|---|---|
| 2007/0104283 A1* | 5/2007 | Han et al. | 375/260 |
| 2007/0183380 A1* | 8/2007 | Rensburg et al. | 370/338 |
| 2007/0263746 A1* | 11/2007 | Son | 375/267 |
| 2007/0274411 A1* | 11/2007 | Lee et al. | 375/267 |
| 2008/0096488 A1* | 4/2008 | Cho et al. | 455/69 |

* cited by examiner

*Primary Examiner* — Shuwang Liu
*Assistant Examiner* — Kabir A Timory
(74) *Attorney, Agent, or Firm* — Carrie A. Boone, P.C.

(57) ABSTRACT

A unified open loop single-user/multiple-user multiple-input-multiple-output (MIMO) system and method are disclosed. The system and method operate without use of channel state information feedback. Instead, the method utilizes channel quality indicator feedback to schedule users to spatial resource blocks. Both symmetric multi-user MIMO schemes (like 2×2 and 4×4) and asymmetric multi-user MIMO schemes are considered. CQI feedback and reduction proposals are also introduced. The method may be used in a proposed network topology.

15 Claims, 11 Drawing Sheets

Figure 2

| | frame l | frame l + 1 | ... | frame x | frame x + 1 |
|---|---|---|---|---|---|
| sub-channel k | $V_k, 0$ | $V_k, 0$ | ... | $V_k, 0$ | $V_k, 1$ |
| sub-channel k + 1 | $V_{k+1}, 0$ | $V_{k+1}, 0$ | ... | $V_{k+1}, 0$ | $V_{k+1}, 1$ |
| sub-channel k + 2 | $V_{k+2}, 0$ | $V_{k+2}, 0$ | ... | $V_{k+2}, 0$ | $V_{k+2}, 1$ |
| sub-channel k + 3 | $V_{k+3}, 0$ | $V_{k+3}, 0$ | ... | $V_{k+3}, 0$ | $V_{k+3}, 1$ |
| sub-channel k + 4 | $V_{k+4}, 0$ | $V_{k+4}, 0$ | ... | $V_{k+4}, 0$ | $V_{k+4}, 1$ |

| CQI (dB) | user 1 | user 2 | user 3 | user 4 | user 5 |
|---|---|---|---|---|---|
| stream 1 | 1 | 20 | 1.2 | 2 | 4 |
| stream 2 | 3 | 15 | 1.5 | 1 | 0 |

Figure 6B

| CQI (dB) | user 1 | user 2 | user 3 | user 4 | user 5 |
|---|---|---|---|---|---|
| stream 1 | 1 | -3 | 1.2 | 2 | 4 |
| stream 2 | 3 | -1 | 1.5 | 1 | 0 |

OPEN LOOP MU-MIMO

CROSS-REFERENCE TO RELATED APPLICATIONS

This application claims priority under 35 U.S.C. 119(e) to U.S. Provisional Patent Application No. 60/955,155, entitled, "ADVANCED WIRELESS COMMUNICATION SYSTEMS AND TECHNIQUES", filed on Aug. 10, 2007.

TECHNICAL FIELD

This application relates to multiple-input, multiple-output (MIMO) communication and, more particularly, to multiple-user MIMO.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g, as well as 802.16, are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps). An 802.16m standard has been initiated, which supports the International Telecommunication Union (ITU) IMT-ADVANCE (also known as "4G"). Advanced MIMO is essential technology to fulfill the target requirement of IMT-ADVANCE.

Single-user MIMO, or SU-MIMO, involves communications between a single base station (BS) and a mobile station (MS) or subscriber station (SS). Multiple-user MIMO, or MU-MIMO, is concerned with communication between the BS and multiple MSs or SSs. During the uplink, multiple MSs transmit data to the BS; during the downlink, the BS transmits signals to multiple MSs in a single resource block. MU-MIMO may benefit from both multi-user diversity and spatial diversity, and can obtain higher throughput than the SU-MIMO system.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is a diagram illustrating the V matrix in different frames and sub-channels, used by the USM method of FIG. 1, according to some embodiments;

FIGS. 6A and 6B are tables illustrating single-user and multiple-user MIMO, respectively, according to some embodiments;

DETAILED DESCRIPTION

In accordance with the embodiments described herein, a unified open loop single-user/multiple-user (USM) multiple-input-multiple-output (MIMO) system and method are disclosed. The USM MIMO system and method operate without use of channel state information (CSI) feedback. Instead, the method utilizes channel quality indicator (CQI) feedback to schedule users to spatial resource blocks.

In describing the USM MIMO system and method herein, both symmetric MU-MIMO schemes (like 2×2 and 4×4) and asymmetric MU-MIMO schemes are considered. CQI feedback and reduction proposals are also introduced. The extension of MU-MIMO to a new network topology is also provided.

In an orthogonal frequency division multiple access (OFDMA) system, the major gain of USM is from the multi-user diversity together with time, frequency selectivity, and spatial selectivity. For a single-user MIMO system, the multi-user diversity is less than in the MU-MIMO case because of the lack of spatial selectivity.

The proposed USM method works in band adaptive modulation and coding (AMC) mode for frequency-time-spatial (F-T-S) selective scheduling. The method may also operate in partially used sub-carrier (PUSC) mode, and there is no such F-T-S selective scheduling gain. Only the band AMC mode is considered herein.

Figure 1:
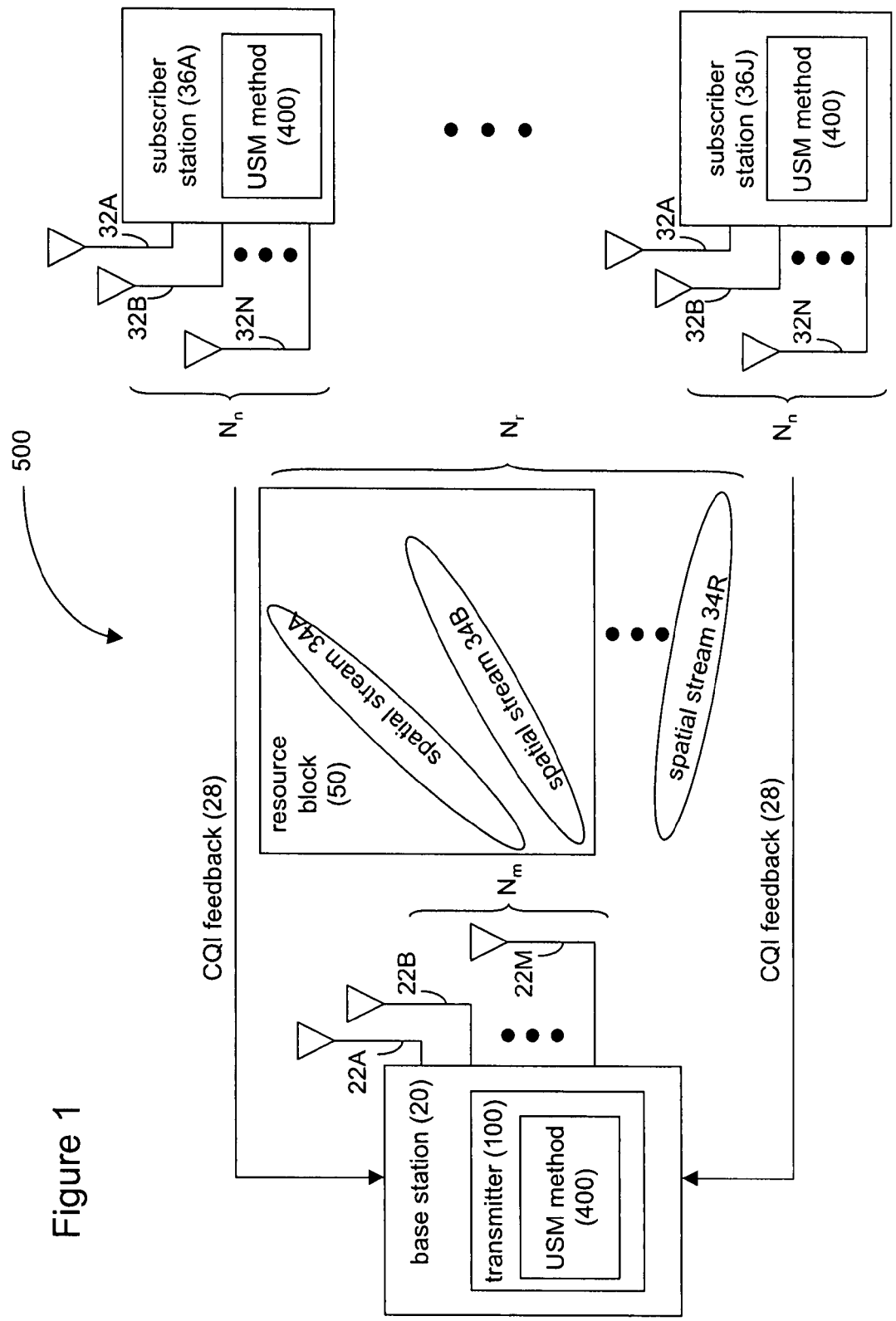
FIG. 1 is a block diagram of a USM system and method, according to some embodiments.

FIG. 1 is a diagram of a USM system 500, according to some embodiments. The USM system 500 consists of a base station 20 and J subscriber stations (receivers) 36A, ..., 36J (collectively, subscriber stations 36), each of which has multiple antennas 22, 32. The base station 20 includes a transmitter 100, which is described in more detail in FIG. 3, below. The base station 20 has m antennas 22A, 22B, ..., 22M (collectively, transmit antennas 22). The subscriber stations 36 each have n antennas 32A, 32B, ..., 32N (collectively, receive antennas 32). In the USM system 500, the transmit antenna number, $N_m$, is larger than the receiver antenna number, $N_n$, for each subscriber station 36. Stated mathematically, $N_m > N_n$. The base station 20 generates a resource block 50, which may consist of multiple spatial streams 34.

Each subscriber station 36 transmits CQI feedback 28 to the base station 20. In the USM system 500, the base station 20 transmits multiple fixed or semi-static spatial streams 34A, 34B, ..., 34R (collectively, spatial streams 34) in each resource block (not shown). Each resource block may have different spatial streams 34. The spatial streams 34 may be scheduled to multiple users or to a single user, according to the CQI feedback 28 received from each subscriber station 36 in a unified manner, with no single-user/multiple-user mode adaptation needed, as described in more detail, below. The terms SS and user refer to the same entity 36 shown in FIG. 1, and these terms are used interchangeably throughout the detailed description.

The USM system 500 employs a USM method 400, also described herein, according to some embodiments. The USM method 400 is an algorithm that enables the multiple-antenna base station 20 to communicate with many multiple-antenna subscriber stations 36, as depicted in FIG. 1, using spatial streams 34 and CQI feedback 28. The base station 20 and each of the subscriber stations 36 use the USM method 400, as shown in FIG. 1. The USM method 400 may consist of software, hardware, or a combination of software and hardware.

In addition to the number of antennas, the number of supported streams, given by $N_s$, and the number of users allocated to a sub-channel, given by $N_u$, are relevant to signal transmission, with there being at least one user and one or more sub-channels. Stated mathematically, $1 \leq N_u \leq N_s$. The $N_s$ streams of data to be transmitted may be given by the following equation:

$$S = (s_0\, s_1 \ldots s_{Ns-1})' \quad (1)$$

Each data stream may be allocated to $N_u$ users, with $1 \leq N_u \leq N_s$. With $u_i$ defined to be the number of allocated streams for the $i^{th}$ user, the following equation results:

$$\sum_{i=0}^{Nu-1} u_i = \text{Rank} <= N_S \quad (2)$$

Depending on the different stream allocation, several modes may exist: single-user mode, multiple-user mode, and hybrid mode. Each of these modes is described in turn.

Single-User Mode (Mode 1)

In single-user mode, $N_u=1$, meaning that all of the $N_s$ streams are allocated to one user. For example, if $N_m=4$, $N_s=4$, $N_u=1$, $u_0=1$ (rank=1), $S=(s_0\, 0 \ldots 0)$, the result is a single-user rank 1 case, which is useful for an edge-conditioned or bad channel-conditioned user to improve the channel quality. In cellular systems, the cell edge user typically experiences more interference, relative to the other cell users, with a lower performance resulting from this interference. If $N_m=4$, $N_s=4$, $N_u=1$, $u_0=4$ (rank=4), $S=(s_0\, s_1 \ldots s_3)$, the result is a single-user "full rank" case, which is a spatially multiplexed MIMO situation. Other cases are "deficient rank" spatial division multiplexing (SDM) for a single user. Rank is, at most, equal to the number of supported streams, $N_s$. Stated mathematically, rank $\leq N_s$.

Multiple-User Mode (Mode 2)

In multiple-user mode, $N_u=N_s$, and $u_i=1$ for any user, which means each user is allocated a single spatial stream. This constitutes a spatial division multiple access (SDMA) situation.

Hybrid Mode (Mode 3)

In hybrid mode, $N_u<N_s$ and $N_u \geq 2$. Multiple users are allocated to one sub-channel, and some users have more than one stream.

In the USM method 400 described herein, according to the feedback of CQI and the tradeoff between efficiency and fairness, the scheduler will dynamically decide the total number of streams, $N_s$, as well as the stream allocation pattern for one or more users. As a result, the above three modes will appear, but the probability of each mode occurring is different. When the number of users, $N_u$, is large, most of the cases are characterized as either being multiple-user mode (mode 2) or hybrid mode (mode 3), in which the USM method 400 can obtain the F-T-S selective gain efficiently, and can show the advantage of multi-user MIMO over single-user MIMO in single-user mode (mode 1). The USM method 400 thus can implicitly support single-user MIMO (mode 1) and multi-user MIMO (modes 2 and 3) without need of extra signaling and adaptation overhead. The USM method 400, as described herein, may thus be regarded as a unified approach for SU-MIMO and MU-MIMO.

Channel Quality Indicator (CQI)

There exist several kinds of CQI: horizontal spatial multiplexing (HSM) CQI, HSM CQI with serial interference cancellation (HSM+SIC) CQI, and vertical spatial multiplexing (VSM) CQI. Each of these is discussed in turn.

Horizontal Spatial Multiplexing CQI

With horizontal spatial multiplexing CQI, the CQI is calculated assuming each spatial stream is independent. Further, the modulation and coding scheme (MCS) may be different for each stream.

HSM+Serial Interference Cancellation CQI

With horizontal spatial multiplexing with serial interference cancellation CQI, with a SIC receiver, the interference from the former stream is cancelled, and the spatial streams are detected layer by layer. The channel quality for the latter layer will be increased after the cancellation of interference. The resulting CQI is the CQI after SIC cancellation, and is valid for the spatial stream, except for the first spatial stream.

When the mode is either multi-user or hybrid mode, when using HSM plus SIC CQI in the data detection stage, the receiver must detect the data of other users and then cancel the data.

A SIC receiver may provide better throughput gain compared with a non-SIC receiver. However, the complexity of a SIC receiver is higher than for a non-SIC one. Further, there is a need to detect the signal from other users and cancel the data from other users in multi-user MIMO. Further, in MU-MIMO, with user selection and stream scheduling, the crosstalk (inter-stream interference, or ISI) is small, and the gain from SIC will decrease.

In some embodiments, the benefits and drawbacks from SIC are evaluated carefully compared with a maximum likelihood detection (MLD) receiver, so as to evaluate the gain of SIC in the multi-user case.

Vertical Spatial Multiplexing CQI

There exists one vertical spatial multiplexing (VSM) channel quality indicator for multiple streams of one user. The modulation and coding scheme (MCS) of each stream belonging to one user are the same.

Two methods may be used to indicate the type of CQI. The first method is to indicate what kind of type is preferred by the subscriber station (SS) when feedback of the corresponding CQI occurs. In the first method, more information bits are employed for feedback, known herein as flexible CQI.

The second method is to decide the CQI type when the CQI channel (CQICH) is established, and to fix the type until an update from the BS occurs. In this method, known herein as fixed CQI, no extra CQI should be fed back.

For horizontal spatial multiplexing CQI, the subscriber station, SS, estimates the channel quality for each spatial stream, assuming equal power allocation between streams, and feeds the estimated channel quality back to the base station, BS. When the BS decides the deficient rank, the power-loading between the stream is utilized (the power of some streams is set to zero). After power-loading, the CQI may be estimated by the BS naturally, according to the power-loading factor and the feed-backed CQI. The USM method 400 does not use extra signaling (in case the crosstalk from other streams is much smaller than the interference from the other cell). The other cell is a neighboring interfering cell.

One example is the rank 1 case. In the rank 1 case, all the power is allocated to a single user. Further, the feed-backed CQI estimated assumes an equal power allocation. The CQI is thus scaled according to the power boot factor.

CQI type adaptation from HSM CQI to HSM plus SIC CQI or VSM CQI needs extra feedback because of the big difference between the CQI values.

The USM method 400 aims to explore the gain from F-T-S selective scheduling gain, and preference to the multi-user (mode 2) or hybrid (mode 3) modes, in most cases. The probability of adaptation to VSM CQI is minimal, in some embodiments. Because of the complexity and small gain from the SIC receiver in MU-MIMO, the second CQI method (fixed CQI) is used by the USM method 400, with the SS feeding back the HSM CQI, unless the BS decides to feed back HSM plus SIC CQI or VSM CQI when the establishment of CQICH takes place.

The USM method 400 utilizes a pre-defined pre-coding matrix, V, as described below, to carry multiple streams from multiple users. The multiple stream data are derived from space-time coding, such as space-time block codes (STBC), spatial multiplexing (SM), or space-time trellis codes (STTC), and so on. A V matrix multiplies the data symbol after space-time coding, before being sent to the antenna. The V matrix may be in any form, as long as the matrix has dimension, $N_m \times N_s$. The V matrix should be under the constraint of power, and some other issue, such as peak-to-average power ratio (PAPR).

In the USM method 400, the single or multiple streams of data are multiplied by the V matrix, and each column of V forms a spatial stream. In one frame, each sub-channel has a different V matrix.

The purpose of the V matrix is to introduce the fluctuation in the frequency, time, and spatial domains. The fluctuation will benefit the "T-F-S" multi-user diversity, especially in the flat fading channels. However, the frequent change of the V matrix introduces the frequent CQI feedback from the SS. In some embodiments, the V matrix is maintained for a period, k, to reduce the CQI feedback overhead. (A fixed V matrix may be thought of as a special case of a periodically changing V matrix, in which the period is infinite.)

FIG. 2 is a diagram illustrating the V matrix in different frames and sub-channels, used by the USM method 400, according to some embodiments. FIG. 2 shows that, in different resource blocks, different V matrixes are used for the preceding, and changing slowing in time (semi-static) matrix. In the first sub-channel, sub-channel k, the $V_k$ matrix is used for each frame; in the next sub-channel, sub-channel k+1, a matrix, $V_{k+1}$, is used for each frame; and so on. Thus, each sub-channel may have a different pre-coding matrix. The sub-channels in FIG. 2 are in the frequency domain while the frames are in the time domain.

There are two kinds of MU-MIMO: open-loop and closed loop. In close-loop MU-MIMO, the transmitter knows the channel state information. In open-loop MU-MIMO, the transmitter does not know the channel state information. The USM method 400 is a open-loop MU-MIMO algorithm.

A different open-loop space-time coding (STC) introduces a different form of open-loop MU-MIMO. There are several kinds of existing STC, any of which may be used in open-loop MU-MIMO. In open-loop MU-MIMO, several users may be held in one resource block (RB). Further, each user may use a different or the same STC mode, and each user may take the same number or a different number of spatial streams (rate). (The terms "rank" and "rate" are both used to describe the allocated number of spatial streams, $N_r$.) For example, in a 4×2 configuration (rate=2), two users are allocated as part of a single RB, with one user taking a 2×2 Alamouti code (rate=1), and the other user using SM (transmitting one spatial stream of data (rate=1). An Alamouti code, designed for a two-antenna transmitter, has the following coding matrix:

$$C2 = \begin{bmatrix} s_1 & s_2 \\ -s_2^* & s_1^* \end{bmatrix} \quad (3)$$

where * is the complex conjugate.

Figure 3:
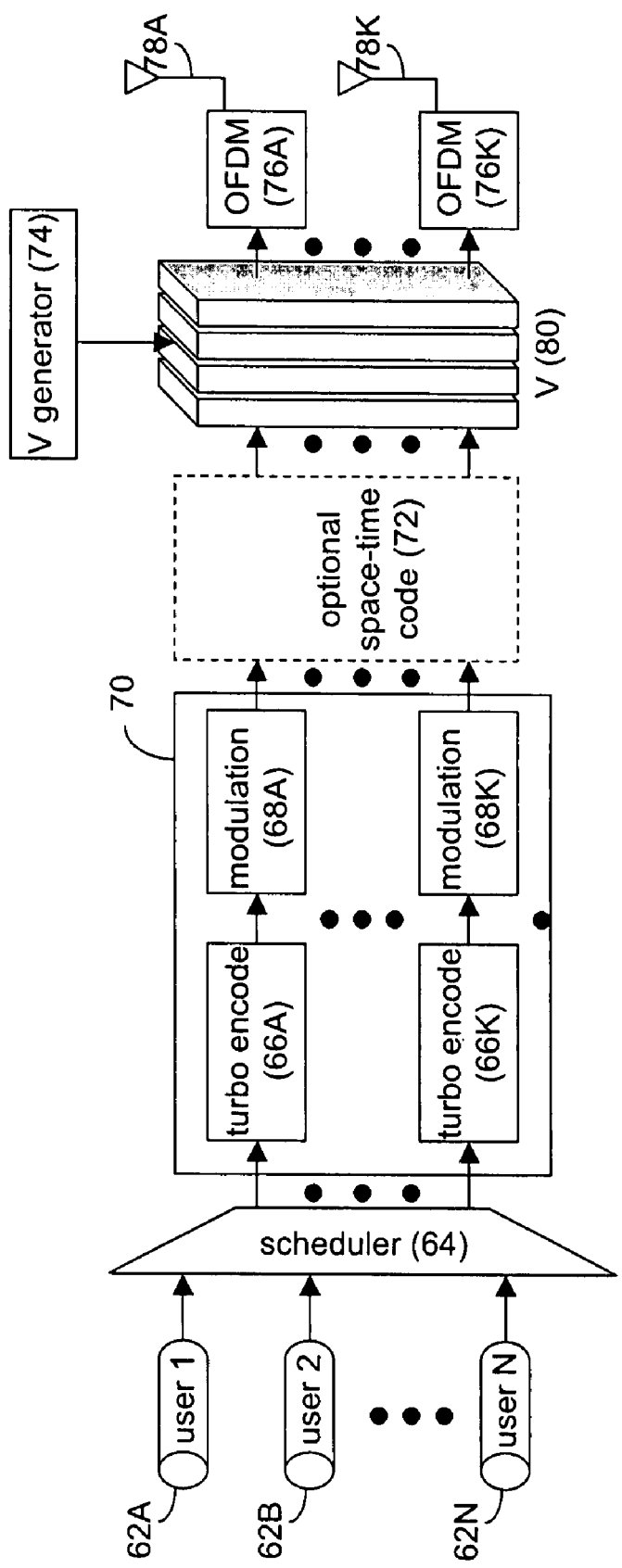
FIG. 3 is a diagram of a transmitter used by the USM method of FIG. 1, according to some embodiments.

A transmitter 100 employing the USM method 400 is depicted in FIG. 3, according to some embodiments. The transmitter 100 may be part of the base station 20 in the USM system 500 (FIG. 1). The transmitter 100 transmits data to N users 62A, 62B, ..., 62N (collectively, users 62), with the users 62 being subscriber stations in the network neighborhood of the base station. The transmitter 100 includes a modulation/coding block 70, which includes multiple turbo encoders 66A, ... 66K and multiple modulators 68A, ... 68K, with K being equal to the number of spatial streams. The data streams are then optionally fed into a space-time code (STC) block 72, which do space-time encoding, such as SM, STBC, etc. The resulting data is then fed into the V matrix 80, produced by the V generator 74. In some embodiments, the V generator 74 uses a general transmission equation, such as equation 4, below, to generate the V matrix. The V generator 74 may further employ discrete Fourier transform on the data stream, as specified in equation 5, below. Finally, OFDM engines 76 multiplex the data signals before being transmitted over the air by antenna 78A, ..., 78K.

The spatial multiplexing (SM) and space-time block code (STBC) modes, as well as a hybrid of the two modes, are described in the following paragraphs.

Spatial Multiplexing MU-MIMO

Transmitter

The allocated number of streams, $N_r$=rank<=$N_s$, with $N_s$ being the number of supported streams. In spatial multiplexing (SM) mode, the $N_r$ stream data, $S=(s_0 \ s_1 \ \ldots \ s_{Nr-1})'$, equation (1), is first multiplexed into $N_s$ streams with some hole if the allocated number of streams, $N_r$, is less than the available number of streams, $N_s$($N_r$<$N_s$). $S^* = (s_{x_0} s_{x_1} \ldots s_{x_{Ns-1}})$, where $x_i$ defines a map from $N_r$ streams of data to $N_s$ streams, and if $x_i \notin [0:Nr-1]'$, $x_i$=0.

The transmitted signal is represented by the following equation:

$$\begin{pmatrix} a_0 \\ a_1 \\ \vdots \\ a_{Nm-1} \end{pmatrix} = V_{k,t} \times S^* = (p_0 v_0 \quad p_1 v_1 \quad \cdots \quad p_{Ns-1} v_{Ns-1})S^*, \quad (4)$$

where $p_i i \in [0:Ns-1]'$ is the power-loading factor, and $$\sum_{i=0}^{Ns-1} p_i = P.$$

When with equal power full rank, $$p_i = \frac{1}{Ns}P,$$

for any i. When with deficient rank $(N_r<N_s)$, $p_i=0$ when $x_i=0$.

More advanced power-loading may be utilized to boost the system throughput and improve the performance of the edge user.

For illustration, the following examples are given:

EXAMPLE 1

2×2 Rank 2 Equal Power $$\begin{pmatrix} a_1 \\ a_2 \end{pmatrix} = V_{k,t} \times S^* = 0.5^*(\sqrt{p}v_0 \quad \sqrt{p}v_1)\begin{pmatrix} s_1 \\ s_2 \end{pmatrix},$$

with $v_i$ as the 2×1 vector.

EXAMPLE 2

2×2 Rank 1 with Power-Loading

The vector, V, is a 2×2 matrix. If $N_r=1$, the configuration is a rank 1 MIMO. The transmission equation is:

$$\begin{pmatrix} a_1 \\ a_2 \end{pmatrix} = V_{k,t} \times S^* = (\sqrt{p}v_0 \quad 0)\begin{pmatrix} s_1 \\ 0 \end{pmatrix},$$

for two transmit antennas.

EXAMPLE 3

2×2 Rank 1 with Equal Power

Another approach for the deficient rank is to duplicate the source signal to multiple spatial streams. In the receiver, a combining technique is used, in some embodiments, to enhance the signal quality.

For example, with rank 1 MIMO. The transmission equation may be:

$$\begin{pmatrix} a_1 \\ a_2 \end{pmatrix} = V_{k,t} \times S^* = (\sqrt{p}v_0 \quad \sqrt{p}v_1)\begin{pmatrix} s_1 \\ s_1 \end{pmatrix},$$

for two transmit antennas.

EXAMPLE 4

4×2 Rank 2

$$\begin{pmatrix} a_1 \\ a_2 \\ a_3 \\ a_4 \end{pmatrix} = V_{k,t} \times S^* = 0.5^*(\sqrt{p}v_0 \quad \sqrt{p}v_1)\begin{pmatrix} s_1 \\ s_2 \end{pmatrix},$$

where $v_i$ is the 4×1 vector.

EXAMPLE 5

4×2 Rank 4

$$\begin{pmatrix} a_1 \\ a_2 \\ a_3 \\ a_4 \end{pmatrix} = V_{k,t} \times S^* = 0.5^*(\sqrt{p}v_0 \quad \sqrt{p}v_1 \sqrt{p}v_2 \quad \sqrt{p}v_3)\begin{pmatrix} s_1 \\ s_2 \\ s_3 \\ s_4 \end{pmatrix},$$

where $v_i$ is the 4×1 vector.

In Example 5, where the allocated spatial stream number, $N_r$, is greater than the number of antennas in the receiver (b of a×b), using a linear detection algorithm (such as minimum mean square error, MMSE), the receiver may not detect all of the four spatial streams successfully. The subscriber station should be able to detect two of the spatial streams, and treat the other two spatial streams as interference.

A simple solution is to fix the antenna group. For example, suppose spatial streams, $s_1$ and $s_2$, are in the same group (group 1) and spatial streams, $s_3$ and $s_4$, are in a second group (group 2). When the CQI is estimated and the signal detected, the two groups should be jointly processed. When the CQI of the spatial stream, $s_1$, is estimated, the subscriber stations should jointly process the spatial streams of group 1, that is, both spatial stream, $s_1$, and spatial stream, $s_2$, and the spatial streams of group 2, $s_3$ and $s_4$, should be treated as interference.

V Matrix

The purpose of the V matrix is to introduce the fluctuation in the frequency, time, and spatial domains to obtain the "T-F-S" multi-user diversity, especially in the flat fading channel. In some embodiments, the selection of the V matrix considers the effect of fluctuation and the peak-to-average power ratio (PAPR) issue. When calculating the channel quality, the V matrix is multiplied by an estimated channel, H. In order to avoid the boost of noise from a channel estimation (CE), a unitary matrix may be used. In some special cases, a non-unitary matrix is a good choice.

In designing the V matrix, each antenna receives equal power, in some embodiments. If the power of each row of the V matrix is the same, the power from each antenna will be the same.

In some embodiments, the V matrix may be changed periodically. (A non-changing V matrix is a special case.) For the ease of CQI estimation, both the BS and the SS should know the V matrix change pattern. In other words, the BS and the SS should be synchronized with respect to the V matrix.

For the synchronization, the V matrix is generated by an equation and is known to both the BS and the SS. A cell identifier (ID), a sector ID, a frame number, and a sub-channel number are used to determine the V matrix, in some embodiments.

Among unitary matrixes, a discrete Fourier transform (DFT) matrix has a constant amplitude, which will not introduce a peak-to-average power ratio (PARA) issue.

The DFT matrix equation is as follows:

$$v_m^{(g)} = \frac{1}{\sqrt{M}}\left[v_{0m}^{(g)} \quad \ldots \quad v_{(M-1)m}^{(g)}\right]^T \quad (5)$$

$$v_{nm}^{(g)} = \exp\left\{j\frac{2\pi n}{M}\left(m + \frac{g}{G}\right)\right\}$$

where G is the total number of V matrixes, g is the index of V from the G matrix, and m is the column index of V which corresponding to a spatial stream.

For example, for a configuration with two transmit antennas (M=2) and eight possible groups (G=8), the DFT matrix equation is:

$$V^0 = \frac{1}{\sqrt{2}}\begin{bmatrix} 1 & 1 \\ 1 & -1 \end{bmatrix}, V^1 = \frac{1}{\sqrt{2}}\begin{bmatrix} 1 & 1 \\ e^{j\frac{1}{8}\pi} & e^{j\frac{9}{8}\pi} \end{bmatrix}, \quad (6)$$

$$V^2 = \frac{1}{\sqrt{2}}\begin{bmatrix} 1 & 1 \\ e^{j\frac{1}{4}\pi} & e^{j\frac{5}{4}\pi} \end{bmatrix}, V^3 = \frac{1}{\sqrt{2}}\begin{bmatrix} 1 & 1 \\ e^{j\frac{3}{8}\pi} & e^{j\frac{11}{8}\pi} \end{bmatrix},$$

$$V^4 = \frac{1}{\sqrt{2}}\begin{bmatrix} 1 & 1 \\ e^{j\frac{1}{2}\pi} & e^{j\frac{3}{2}\pi} \end{bmatrix}, V^5 = \frac{1}{\sqrt{2}}\begin{bmatrix} 1 & 1 \\ e^{j\frac{5}{8}\pi} & e^{j\frac{13}{8}\pi} \end{bmatrix}, \quad (7)$$

$$V^6 = \frac{1}{\sqrt{2}}\begin{bmatrix} 1 & 1 \\ e^{j\frac{3}{4}\pi} & e^{j\frac{7}{4}\pi} \end{bmatrix}, V^7 = \frac{1}{\sqrt{2}}\begin{bmatrix} 1 & 1 \\ e^{j\frac{7}{8}\pi} & e^{j\frac{15}{8}\pi} \end{bmatrix}$$

The equation of the V generator should select an index (g) of the V matrix for each sub-channel from the pool within which there are G candidate V matrixes.

The V matrix is an $N_m \times N_s$ matrix, with $N_m$ being the number of transmit antennas and $N_s$ being the number of supported streams. When the number of supported streams, $N_s$, is smaller than the number of transmit antennas, $N_m$, such as with a 4×2 configuration supporting two streams, an $N_m \times N_m$ V matrix is generated first (considering only the number of transmit antennas). Subsequently, an $N_s$ column may be used to construct the $N_m \times N_s$ V matrix.

Figure 4:
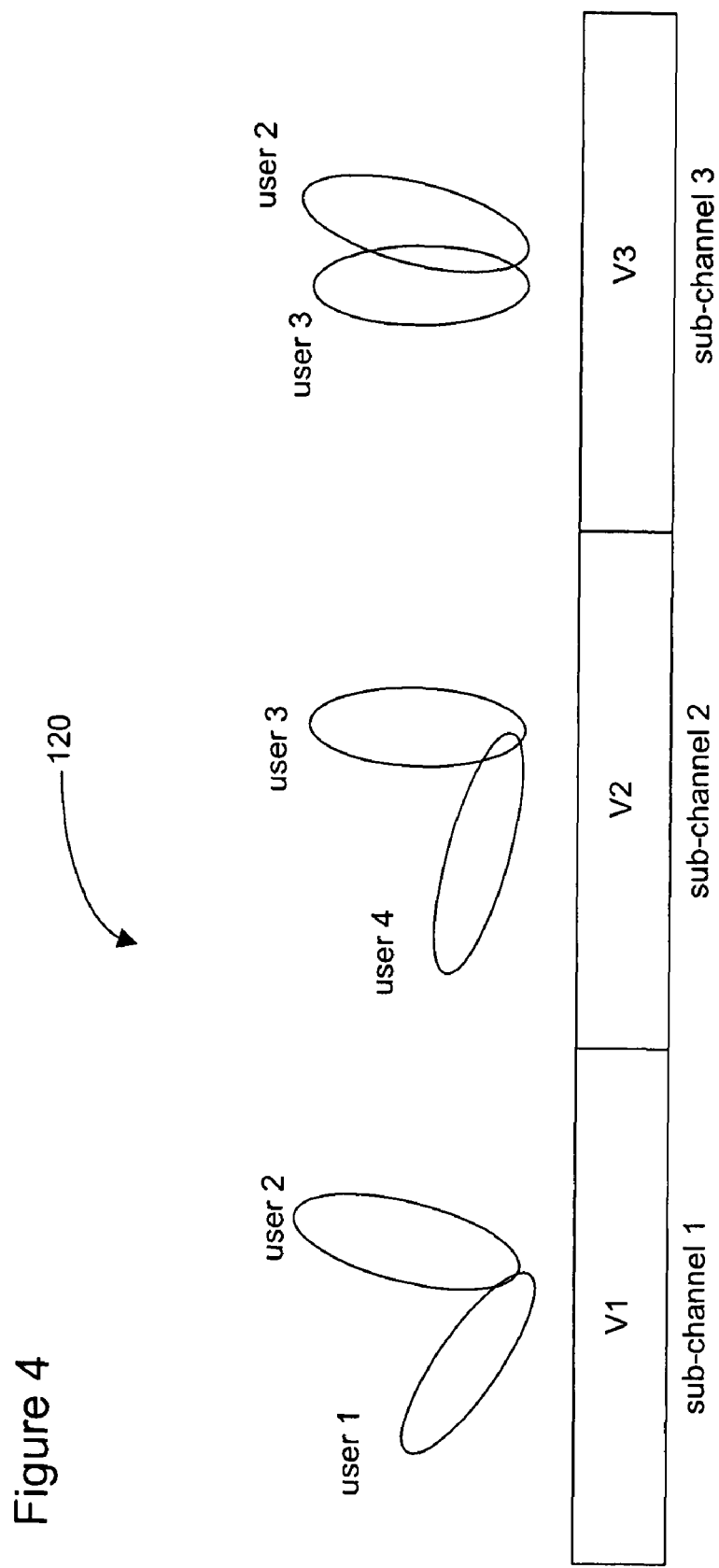
FIG. 4 is an illustration of a V vector used in different sub-channels, according to some embodiments.

An illustration 120 of a V vector used in different sub-channels is depicted in FIG. 4, according to some embodiments. In the illustration 120, matrixes V1, V2, and V3 are used in sub-channels 1, 2, and 3, respectively. Four users, user 1, user 2, user 3, and user 4, are shown. User 1 occupies sub-channel 1 only; user 2 occupies sub-channels 1 and 3; user 3 occupies sub-channels 2 and 3; and user 4 occupies sub-channel 2 only. The ovals representing spatial streams for the users, with each spatial stream corresponding to one column of the V matrix.

Other forms of the V matrix may also be good candidates, such as configurations with four transmit antennas and two supported streams. The following V matrix will introduce the antenna switch and combination. By using this kind of V matrix, the MIMO is an "antenna switch and combination" implementation of MIMO.

$$V_1 = \begin{bmatrix} 1 & 0 \\ 0 & 1 \\ 0 & 1 \\ 0 & 1 \end{bmatrix}; V_2 = \begin{bmatrix} 0 & 1 \\ 1 & 0 \\ 0 & 1 \\ 0 & 1 \end{bmatrix}; V_3 = \begin{bmatrix} 0 & 1 \\ 0 & 1 \\ 1 & 0 \\ 0 & 1 \end{bmatrix};$$

$$V_4 = \begin{bmatrix} 0 & 1 \\ 0 & 1 \\ 0 & 1 \\ 1 & 0 \end{bmatrix}; V_5 = \begin{bmatrix} 1 & 0 \\ 1 & 0 \\ 0 & 1 \\ 0 & 1 \end{bmatrix} \ldots$$

CQI Measure

At frame (sub-frame) n and sub-channel m, the SS may estimate the channel state information (CSI) based on the pilot. The effective channel $\overline{H(n,m)} = H(n,m) \times V(n+D,m)$ may be estimated based on pilot tones. The integer, D, is applied to take the CQI feedback delay into consideration.

CQI calculation is based the effective channel and noise power by minimum mean square error (MMSE), maximum likelihood detection (MLD), or other detection algorithms.

One of the different CQI types, horizontal spatial multiplexing, vertical spatial multiplexing, or HSM with serial interference cancellation, is obtained. In the stage of CQI measurement, the power is assumed to be equally allocated among the different spatial streams.

In some embodiments, channel prediction is utilized to counteract a delay and time domain down sample for CQI feedback. A "down sample" means feedback CQI every few time slots.

Several physical layer (phy) abstractions and link adaption algorithms may exist. In each, the definition of channel quality is different. For example, signal-to-interference-plus-noise ratio (SINR, in dB) may be used for an effective SINR method, and bits may be used for the mutual information method. Effective SINR and mutual information are two methods for indicating the channel quality. In some embodiments, the BS and the SS are synchronized in terms of the channel quality definition used by each.

The SS estimates the CQI of $N_s$ supported streams. This estimate is then fed back to the BS, using a feedback overhead reduction algorithm, in some embodiments.

Space-Time Block Code MU-MIMO

Instead of spatial multiplexing MU-MIMO, the USM method 400 may employ space-time block code (STBC) MU-MIMO, in some embodiments. In STBC, multiple copies of a data stream are transmitted using multiple antennas. At the receiver, some of the transmitted copies will be less corrupted than others. The receiver uses space-time coding to combine all copies of the received signal, hoping to obtain a copy representative of the intended transmission. An STBC may be represented using a matrix, in which each row represents a time slot and each column represents the transmission of one antenna over time.

In STBC MU-MIMO, one code-word is occupied by a single user. Multiple users may be allocated in one resource block, occupying different space-time code-words. The stacked Alamouti space-time code is an example of such MU-MIMO, and is described in the following paragraphs.

Transmitter

Figure 5:
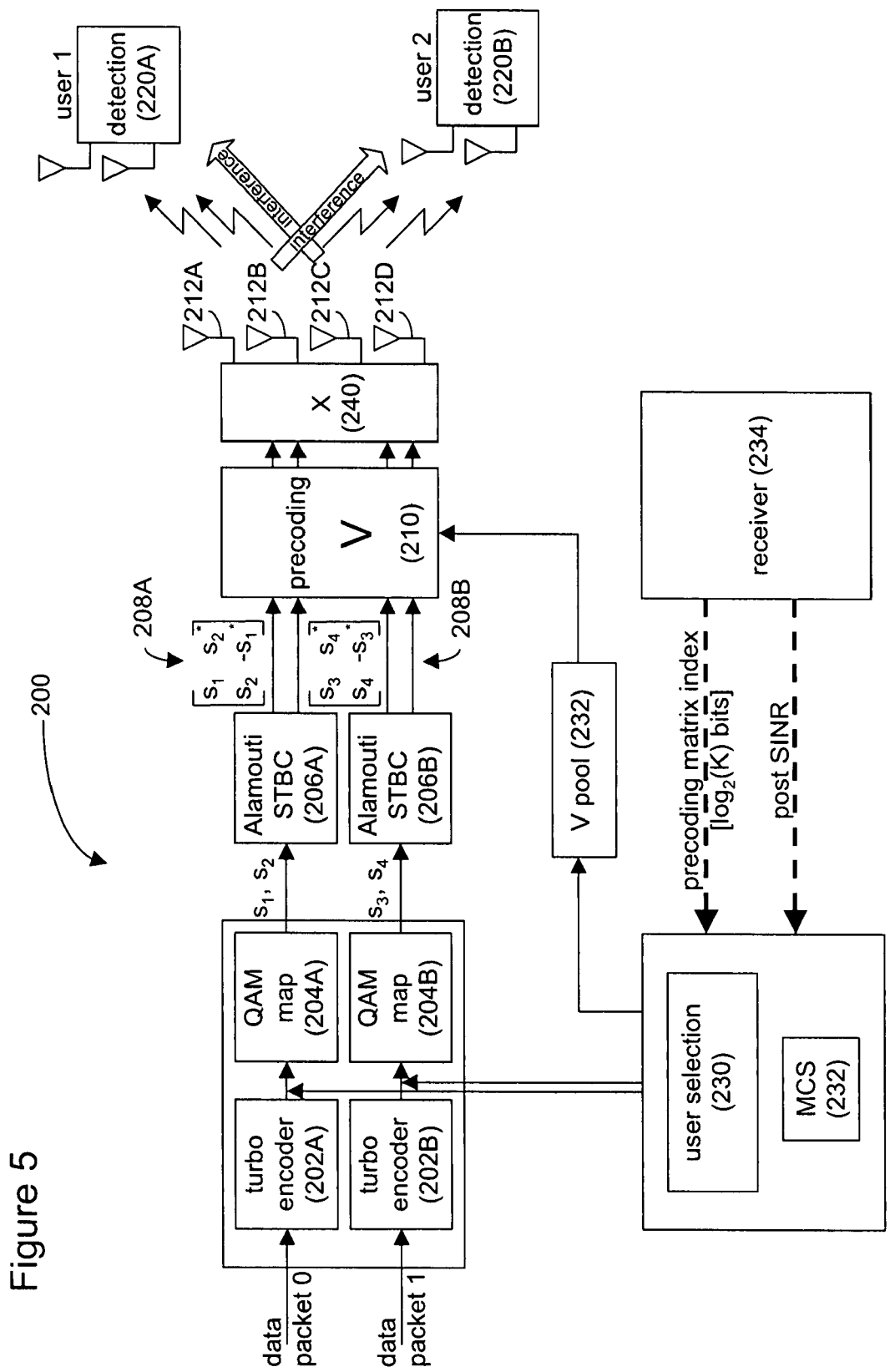
FIG. 5 is a diagram of a transmitter designed to perform space-time block coding multiple-user multiple-input-multiple-output, according to some embodiments.

FIG. 5 is a diagram of a transmitter 200 employing STBC MU-MIMO, according to some embodiments. In explaining operation of the transmitter 200, a 4×2 antenna configuration is used as an example.

There are two users to whom transmission is to be made simultaneously, user 1 and user 2 (at right side of the figure). The spatial streams, $s_1, s_2$ are intended for user 1, while the spatial streams, $s_3, s_4$ are intended for user 2.

In some embodiments, the BS utilizes the 2×2 Alamouti space-time encoders, 206A and 206B, to obtain two Alamouti codes 208A and 208B, as in equation (3), above. The transmitting signal is X 240, which is obtained by the pre-coding matrix V 210.

$$X = V \begin{bmatrix} s_1 & s_2^* \\ s_2 & -s_1^* \\ s_3 & s_4^* \\ s_4 & -s_3^* \end{bmatrix} \quad (8)$$

where $$X = \begin{bmatrix} x_{1,t} & x_{1,t+1} \\ x_{2,t} & x_{2,t+1} \\ x_{3,t} & x_{3,t+1} \\ x_{4,t} & x_{4,t+1} \end{bmatrix}$$

is the transmitting signal at time slots, t and t+1, and $V=[v_1\ v_2\ v_3\ v_4]$ is a 4×4 matrix, with its columns $v_1, v_2, v_3, v_4$ orthogonal each other. A 4×4 DFT matrix is a good candidate for the V matrix selection.

In the design of the USM method 400, the spatial streams are not as straightforward as with symmetric MU-MIMO. However, one Alamouti code may be treated as one stream, with each user occupying one stream. $N_s$, the number of supported streams, is two in this example (thus, two Alamouti codes exist).

In the deficient rank case (rank=1<$N_s$=2), the source data from one user may be duplicated in multiple streams. For example, the transmit data, X, becomes:

$$X = V \begin{bmatrix} s_1 & s_2^* \\ s_2 & -s_1^* \\ s_3 & s_4^* \\ s_4 & -s_3^* \end{bmatrix} \quad X = V \begin{bmatrix} s_1 & s_2^* \\ s_2 & -s_1^* \\ s_1 & s_2^* \\ s_2 & -s_1^* \end{bmatrix} \quad (9)$$

Receiver

For the $i^{th}$ user, with downlink channel, $H_t^i$, at time slot, t, the $i^{th}$ user's received data is represented mathematically as follows:

$$\begin{bmatrix} r_{t,1} & r_{t+1,1} \\ r_{t,2} & r_{t+1,2} \end{bmatrix} = \qquad (10)$$

$$H_t^i \cdot [v_1\ v_2] \cdot \begin{bmatrix} s_1 & s_2^* \\ s_2 & -s_1^* \end{bmatrix} + \underbrace{H_t^i \cdot [v_3\ v_4] \cdot \begin{bmatrix} s_3 & s_4^* \\ s_4 & -s_3^* \end{bmatrix}}_{\text{Interference}} + n$$

where, $$H_t^i = \begin{bmatrix} h_{1,1} & h_{1,2} & h_{1,3} & h_{1,4} \\ h_{2,1} & h_{2,2} & h_{2,3} & h_{2,4} \end{bmatrix}$$

is the user's downlink channel at time slot, t.

Minimum mean-square error (MMSE) detection is used to separate the signal and interference items, in some embodiments. The equivalent channel that was derived from the weighted channel, $H_t^i \cdot [v_1\ v_2]$, $H_t^{ii} \cdot [v_3\ v_4]$ and its Alamouti STBC equivalent channel, $\overline{H}_{t,e}^i$, is given by the following equations, 11 and 12

Equivalent channel:

$$\overline{H}_t^i = \begin{bmatrix} h_{1,1} & h_{1,2} & h_{1,3} & h_{1,4} \\ h_{2,1} & h_{2,2} & h_{2,3} & h_{2,4} \end{bmatrix} \cdot V = \begin{bmatrix} \bar{h}_{1,1} & \bar{h}_{1,2} & \bar{h}_{1,3} & \bar{h}_{1,4} \\ \bar{h}_{2,1} & \bar{h}_{2,2} & \bar{h}_{2,3} & \bar{h}_{2,4} \end{bmatrix} \quad (11)$$

Alamouti equivalent channel:

$$\overline{H}_{t,e}^i = \begin{bmatrix} \bar{h}_{1,1} & \bar{h}_{1,2} & \bar{h}_{3,1} & \bar{h}_{3,2} \\ \bar{h}_{2,1} & \bar{h}_{2,2} & \bar{h}_{4,1} & \bar{h}_{4,2} \\ -\bar{h}_{1,2}^* & \bar{h}_{1,1}^* & -\bar{h}_{3,2}^* & \bar{h}_{3,1}^* \\ -\bar{h}_{2,2}^* & \bar{h}_{2,1}^* & -\bar{h}_{4,2}^* & \bar{h}_{4,1}^* \end{bmatrix} \quad (12)$$

So, equation 10 may be equivalent to equation 13. Equation 13, below, is based on equations 11 and 12.

$$\begin{bmatrix} r_{t,1} \\ r_{t,2} \\ r_{t+1,1}^* \\ r_{t+1,2}^* \end{bmatrix} = \begin{bmatrix} \bar{h}_{1,1} & \bar{h}_{1,2} & \bar{h}_{3,1} & \bar{h}_{3,2} \\ \bar{h}_{2,1} & \bar{h}_{2,2} & \bar{h}_{4,1} & \bar{h}_{4,2} \\ -\bar{h}_{1,2}^* & \bar{h}_{1,1}^* & -\bar{h}_{3,2}^* & \bar{h}_{3,1}^* \\ -\bar{h}_{2,2}^* & \bar{h}_{2,1}^* & -\bar{h}_{4,2}^* & \bar{h}_{4,1}^* \end{bmatrix} \cdot \begin{bmatrix} s_1 \\ s_2 \\ s_3 \\ s_4 \end{bmatrix} + n \quad (13)$$

Here, $r_{t,1}\ r_{t,2}\ r_{t+1,1}\ r_{t+1,2}$ represent the received data at time slots, t and t+1, of two receiver antennas. Based on equation 13, the subscriber station may detect the receiver data based on MMSE detection.

CQI Measurement

With $\overline{H}_t^i$, the user i can calculate four post-SINRs, based on MMSE with its Alamouti equivalent channel $\overline{H}_{t,e}^i$, the former two belonging to the two CQIs of the first stream, and the later two belonging to the two CQIs of the second streams.

Based on an Alamouti equivalent channel (from channel estimation), the SS may obtain the CQI of the two streams by averaging the first two SINRs and the later two SINRs, respectively.

The SS feeds the CQI of the two streams back for the BS scheduling and MCS selection. With BS scheduling, the two streams may be allocated to one user or to two users. Every user will detect the two streams, but in the case where two users have been selected, every user will abandon the data of the other stream. Where only one use has been selected, the BS will allocate the two streams to the selected user, and the user validates the data of the two streams after detection.

Hybrid MU-MIMO

The SM and STBC user may be allocated to a single resource block. For example, with a 4×2 configuration, with a rank of 3, two users are allocated together, one is a STBC user (rate 1), and the other is a SM user (rate 1).

$$\begin{pmatrix} a_1 \\ a_2 \\ a_3 \\ a_4 \end{pmatrix} = V_{k,t} \times S^* = 0.5^*(V) \begin{pmatrix} s_1 & s_2^* \\ s_2 & -s_1^* \\ s_3 & s_5 \\ s_4 & s_6 \end{pmatrix},$$

where $s_1$ and $s_2$ are from user 1 (the STBC user), and $s_3$, $s_4$, $s_5$, and $s_6$ from user 2 (the SM user).

Unified Scheduler

After the SSs feed back the CQI at each sub-channel and for each stream (full CQI feedback case), the BS can schedule users to resource blocks and apply mode and rank adaptation dynamically, based on a specific strategy, such as max C/I, PF, and so on. ("Max C/I" means maximum carrier to interference ratio while "PF" means proportional fairness. Both are types of scheduling algorithms.) The inter-user power-loading is also applied, in some embodiments.

The USM method 400 defines the CQI of user k at sub-channel i and stream j as CQI(k, i, j). K is the total number of active SSs, and $N_b$ is the number of available sub-channels. Using these definitions, the allocated user index, k*, for each resource block, with max C/I scheduler is given by the following pseudo-code:

$$\text{For } i = 1:N_b$$
$$\quad \text{For } j = 1:N_s$$
$$\qquad k^* = \max_{k=1:K} CQI(k, i, j)$$
$$\quad \text{End}$$
$$\text{End}$$

If a fairness scheduling algorithm is used instead of the max C/I scheduler, the above pseudo-code may be replaced by:

$$\text{For } i = 1:N_b$$
$$\quad \text{For } j = 1:N_s$$
$$\qquad k^* = \max_{k=1:K} F(CQI(k, i, j), R_k)$$
$$\quad \text{End}$$
$$\text{End}$$

where function, F( ), is a fairness metric, such as proportional fairness, and $R_k$ is a history data rate.

With proportional fairness, the F( ) function is given by the following equation:

$$F(CQI(k, i, j), R_k) = \frac{CQI(k, i, j)}{R_k}.$$

With this kind of scheduling algorithm, one sub-channel may hold one or multiple users implicitly. The USM method 400 is a unified approach for SU and MU-MIMO. With fairness scheduling, the equation may be modified accordingly.

An example of SU-MIMO and MU-MIMO are shown in FIGS. 6A and 6B, respectively, according to some embodiments. The CQI reported by each user (SS) to the BS is given in each table, in dB. In FIG. 6A, the user 2 reports the highest CQI, 20 dB for stream 1 and 15 dB for stream 2, as compared to reports from the other users to the BS. Thus, both stream 1 and stream 2 are allocated to the user 2 by the BS. In FIG. 6B, user 5 reports the highest CQI for stream 1 (4 dB) while user 1 reports the highest CQI for stream 2 (3 dB). Thus, stream 1 is allocated to user 5 while stream 2 is allocated to user 1. By this kind of multiple-user scheduling, the sum capacity is increased, in some embodiments.

Stream (Rank) Adaptation in MU-MIMO

For some cases, the CQI of a scheduled user may not satisfy the packet error rate (PER) target. In such a circumstance, in some embodiments, rank adaptation to a low rank is applied.

In the USM method 400, stream adaptation is used, in some embodiments. The maximum stream number is $N_s$, while $N_m$ is the total number of transmit antennas. Generally, $N_s \leq N_m$. And, the more streams supported, the more system throughput.

However, some limitations may exist, which limit $N_s$ to be a smaller number. The limitations include the number of receiver antennas, bad channel conditions, and high correlation between antennas. In the first case, if the number of receiver antennas is less than the number of supported streams ($N_n < N_s$), it is possible that the BS may not select the $N_s$ users that the interference from "$N_s$ minus $N_n$" streams is small enough to obtain better sum capacity. In this case, the BS uses a smaller number of streams ($N_s$) to maximize the capacity while maintaining user throughput, in some embodiments.

Where a bad channel condition or high correlation between antennas exists, the channel quality of some cell edge users may be quite bad. In some embodiments, the USM method 400 uses a low number of streams to increase the signal quality. One extreme case is where there is only one available stream, $N_s=1$, and all of the antennas transmit across this same stream for the dedicated user. The antenna correlation also will limit the supported stream number for a specific user.

The stream adaptation is highly correlated to the MIMO mode adaptation, SU/MU adaptation. In the USM method 400, a stream adaptation mode is used for two-transmitter and four-transmitter MIMO cases.

For the two-transmitter case, with a single stream, $N_s=1$, the USM method 400 uses a 2×2 Alamouti code (rate 1). Where there are two streams, $N_s=2$, the USM method 400 uses 2×2 spatial multiplex MU-MIMO (rate 2).

For the four-transmitter case, with a single stream, $N_s=1$, the USM method 400 uses four-transmitter STBC (rate 1). Where there are two streams, $N_s=2$, the USM method 400 uses a stacked Alamouti code (rate 2). Where there are three streams, $N_s=3$, the USM method 400 uses a hybrid mode, with one Alamouti code, together with a two-transmitter spatial multiplex mode. Where there are four streams, $N_s=4$, the USM method 400 employs spatial multiplexing (rate 4).

In some embodiments, the USM method 400 uses one of two kinds of adaptation: semi-static adaptation and subscriber station-controlled adaptation. Each of these is discussed in turn.

With semi-static adaptation, the BS and the SS decide the stream number (mode) that will be valid for a relatively long time. The SS informs the BS when a mode change is desired, in some embodiments. With semi-static adaptation, the SS may only be in one mode at a time. For example, in the 2×2 configuration, the SS may be in a single-stream case ($N_s=1$) when its channel condition is bad, and may switch to a dual-stream mode ($N_s=2$) when the channel becomes good. The switch between single-stream and dual-stream occurs by signaling between the SS and the BS. The SS only needs to estimate the CQI of the current stream (mode), and feed back the CQI of such mode to the BS.

With subscriber station-controlled adaptation, the SS feeds back the CQI of all the possible streams case (mode). For a 2×2 configuration, the are two modes: single-stream and dual-stream modes. The SS estimates the CQI in both single-stream mode and dual-stream mode, and either feeds back all of the CQI, both single- and dual-stream CQI, or feeds back the preferred one with an indication of the CQI preference, to the BS.

In some embodiments, when it schedules a user, the BS takes the stream number into consideration, and decides the stream number and schedules the user under some criteria. The criteria may be, for example, to maximize the system capacity or to guarantee the fairness of a badly conditioned user, that is, a user with a bad channel condition, such as low SINR.

For example, supposed there is a 4×2 or a 2×2 configuration, with a maximum of two streams. The scheduling algorithm with stream adaptation is given by the following pseudo-code:

```
For i = 1:N_b
    For m = 1:N_s_Max
        For j = 1:N_s
            k*(i, j) = max  F(CQI(k, i, j), R_k)
                      k=1:K
        End
        ModeMetric(m, i) = sum(F(CQI(k*(i, j), i, j), R_k*))
    End Mode(i) =   max    ModeMetric(m, i)
              m=1:Ns_Max End
``` where $N_s\_Max$ is the maximum number of streams supported in the system, and Mode(i) is the selected stream number for band, i, and $N_b$ is the number of resource blocks.

In order to reduce the CQI feedback overhead, the SS may only feed back the CQI of its preferred mode. When deciding the mode by the equation, the missing CQI is set to zero or a negative value, in some embodiments.

Two kinds of resource allocation methods for stream adaptation are proposed: a fixed method and a flexible method. Both of these methods are described in turn.

In the communication system, certain resource blocks are allocated to certain stream modes. The resource blocks need the BS to broadcast control information whenever the resource allocation needs to be changed. For example, in the system, one third of the resource blocks may be allocated to a single-stream mode, and serve the bad channel user. The other resource blocks are allocated to the dual-stream mode.

Under the fixed method, associated with the SS semi-static adaptation, the SS estimates the CQI of a certain resource block, and feeds the CQI to the BS. Using the fixed method, the feedback overhead may be reduced, because the number of interested resource blocks is limited to certain ones. The drawback of the fixed method is that it is difficult for the BS to obtain optimal resource allocation that is suitable for the current user and channel.

By contrast, with the flexible method, the mode of any resource block may be flexible, and is decided by the fed back CQI and the scheduling algorithm. The SS feeds the CQI of the resource blocks (either the CQI of all modes or only of the preferred mode with indication) back to the BS. The BS schedules user and streams with the unified scheduling algorithm mentioned above. After scheduling, the mode of certain resource blocks may be decided.

In some embodiments, the flexible method has better performance than the fixed method, because the flexible method fully utilizes the diversity of both the channel and the user. However, the CQI feedback overhead is expected to be somewhat larger than with the fixed method.

Simulation Results

Figure 7:
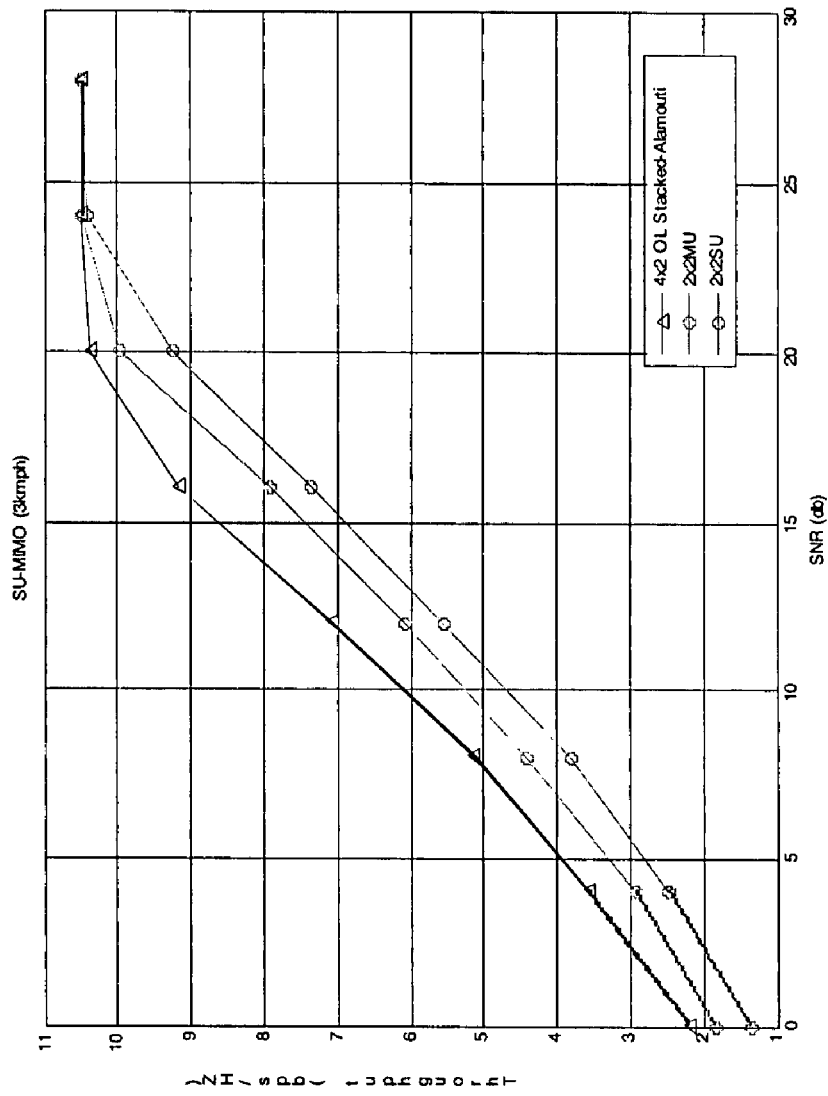
FIG. 7 is a graph illustrating the performance gain of the USM method of FIG. 1 over traditional single-user MIMO algorithms, according to some embodiments.

Table 1 is a list of link-level simulation parameters and their characteristics where link-level simulation is performed, according to some embodiments. The following configurations are tested: a 2×2 configuration with two streams, single-user and multiple-user; a 4×2 configuration with multiple users, stacked Alamouti, and two streams. A link-level simulation with user selection are provided, as depicted in the graph 222 of FIG. 7, according to some embodiments.

TABLE 1 link-level simulation parameters

| link simulation parameter | characteristic |
| --- | --- |
| channel model | TU-6 tap and 0.25 TX correlation |
| MIMO configuration | 2 × 2, 4 × 4 |
| frequency band | 2.1 GHz |
| bandwidth | 10 MHz |
| burst size | 25 sub-carriers × 7 OFDM symbols, 75 × 7 |
| burst number | 24 |
| FFT | 1024 |
| Scheduler | max C/I |
| Velocity | 3 km/h |
| feedback delay | 2 ms |
| feedback downsample | 2.5 ms |
| geometry | 0-24 dB |
| constellation | QPSK 16QAM 64 QAM |
| turbo code rate | 1/3 2/5 1/2 3/5 2/3 3/4 4/5 7/8 |
| HARQ | None |
| Receiver | MMSE |
| link adaptation | Mutual information-based LA |
| user number | 2 5 10 15 20 |
| rank adaptation | None |

Table 2 is a list of system-level simulation parameters and their characteristics where system-level simulation is performed, according to some embodiments.

TABLE 2 system-level simulation parameters

| system simulation parameter | characteristic |
| --- | --- |
| number of cells | 19 |
| number of sectors per cell | 3 |
| total number of sectors | 57 |
| cell radius | 1500 m |
| frequency reuse | 1 × 3 × 1 |
| transmission power/sector | 43 dBm |
| number of transmit antennas | 2 |
| transmit antenna pattern | 70° (−3 dB) with 20 dB front-to-back ratio |
| transmit antenna gain | 17 dBi |
| number of receive antennas | 2 |
| receive antenna pattern | omni-directional |
| receive antenna gain | 0 dBi |
| noise figure | 8 dB |
| hardware losses (e.g., cable, implementation) | 2 dB |
| modulation | QPSK, 16QAM, 64QAM |
| code rate | 1/4, 1/3, 2/5, 1/2, 2/3, 3/4, 4/5, 7/8 |
| sub-channel size | 75 × 7, 25 × 7 |
| bandwidth | 10 MHz |
| FFT size | 1024 |
| sub-frame size | 7 OFDM symbols (0.75 ms) |
| CQI delay | 3 sub-frames |

The system-level result is shown in Table 3, according to some embodiments, and shows the good performance of MU-MIMO.

TABLE 3 performance results

| MIMO scheme | stack Alamouti 4 × 2 open-loop, multi-user | basic open-loop multi-user 2 × 2 | single-user open-loop 2 × 2 |
| --- | --- | --- | --- |
| throughput | 13.08 (bps/HZ) | 11.6 (bps/HZ) | 9.3 (bps/HZ) |

Both the link-level simulation (LLS) and the system-level simulation (SLS) show the good performance of MU-MIMO system.

Extension to Distributed Network Topology

In order to further enhance the system spectrum efficiency, the USM method 400 may be used in a new network topology, in some embodiments. The "new network topology" is generated by separating the $N_m$ transmitter antennas on the BS side to the edge of a cell/sector. Directional antennas are used to reduce the interference (thus, increasing the signal quality). The USM method 400 may be modified in this network topology to obtain more multi-user diversity gain. The separated antennas may be treated as a joint MIMO array.

The benefit of the new network topology is as follows. First, the SINR distribution is improved, due to the merits of having scattered antennas. Secondly, the fluctuation of the channel will become larger and will benefit the USM method 400. Third, more streams (larger than the number of receiver antennas) is possible in such an architecture. Fourth, the transmit antenna correlation is eliminated because the antenna spacing is very large (tens of meters), and will increase the MIMO link quality.

Figure 8:
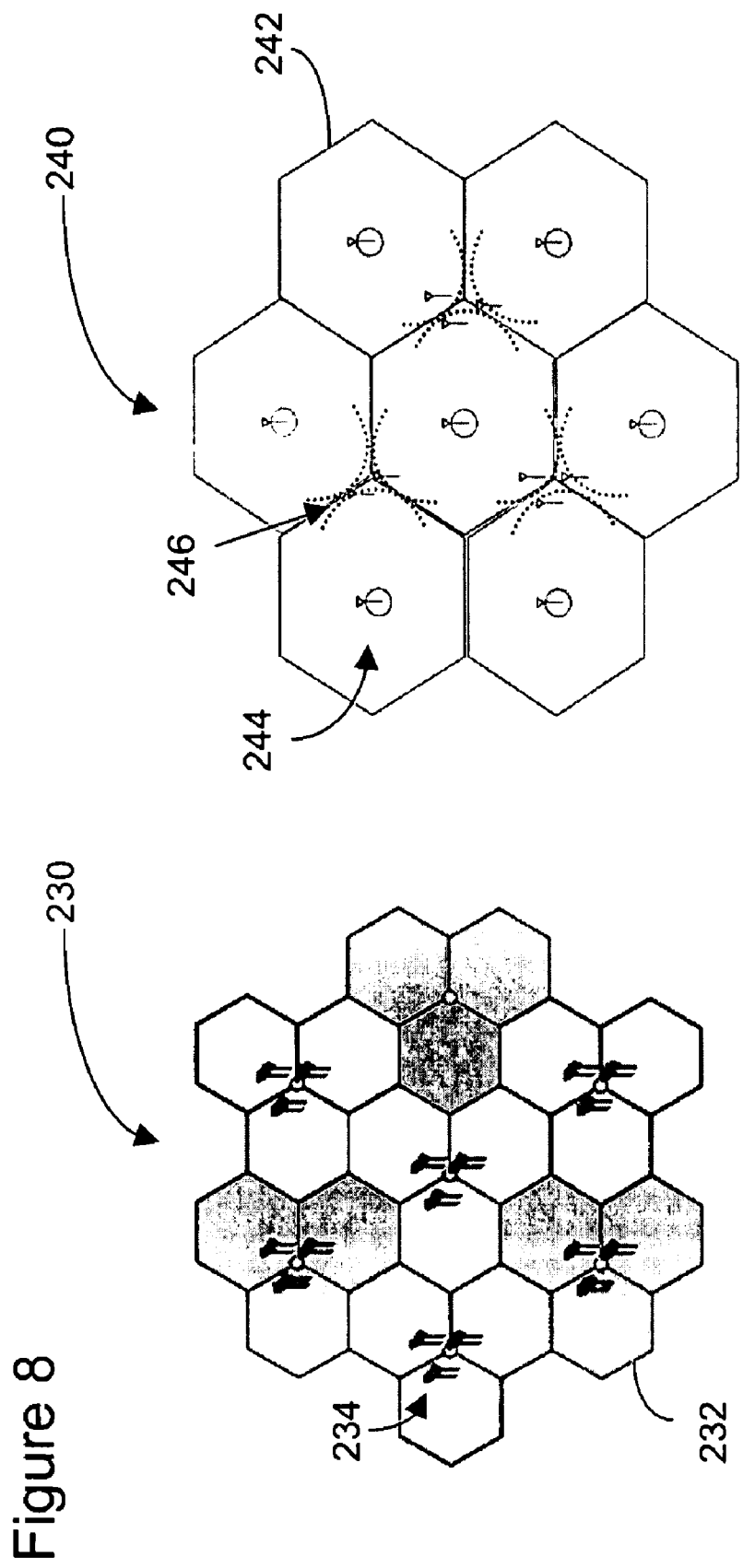
FIG. 8 is an illustration of both prior art and proposed network topologies, according to some embodiments.
Figure 9:
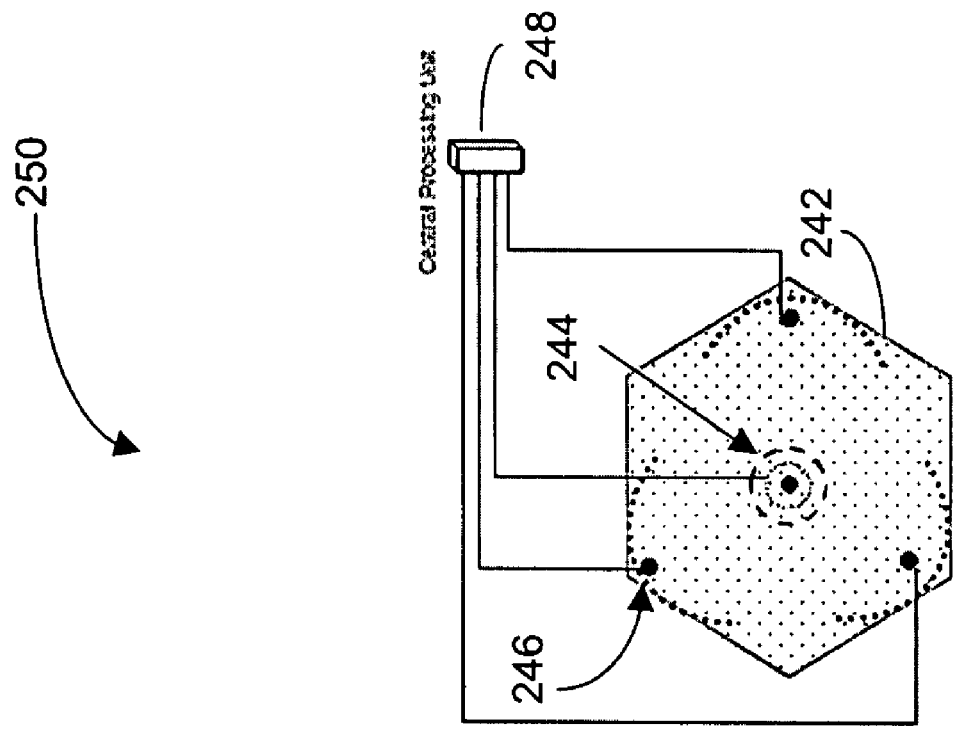
FIG. 9 is a network topology including distributed antennas connected to a central processing unit, according to some embodiments.

One example of such a network topology architecture is depicted in FIG. 8, according to some embodiments. The left figure shows a current (existing) three-sector network topology 230, with four antennas 234 in each sector 232. In the right figure, a network topology 240 is shown, with four antennas of each sector 242 separated to the edge 246 and to the center 244 of the sector. Further, the edge antenna 246 is a directional antenna, pointing toward the center of the sector 242. The separated antennas may be connected by fiber or by cable to the BS (not shown). The remote unit may be a simple radio frequency (RF) unit plus an antenna. The MU-MIMO modes described above, such as SM, STBC, and hybrid, may be used in the network topolology 240. FIG. 9 is a network topology 250, in which the center antenna 244 and the edge antenna 246 in the sector 242 are connected to a central processing unit (CPU) 248.

Two cases of MU-MIMO may be used with the network topology 240: when the number of allocated streams is less than or the same as the number of receiver antennas in the subscriber station ($N_s \leq N_n$); and when the number of streams exceeds the number of receiver antennas in the subscriber station ($N_s > N_n$). Each of these cases is discussed in turn.

$N_s <= N_n$

When the number of streams is less than or equal to the number of receiver antennas in the SS, the baseline USM method 400 may be directly used, with some modification. From the point of view of the SS, there is no difference in signal processing and protocol. On the SS side, the protocol is transparent even when the antennas on the BS side are separated.

However, on the BS side, the V matrix is modified, in some embodiments. In this case, a unitary matrix is not a good choice. In some embodiments, the elements of the V matrix are all 1 or 0, with power adjustment (to normalize the power).

Some examples of a suitable V matrix are as follows, with a configuration of four transmit antennas and two streams, spatial multiplexing, multiple-user MIMO:

$$X = V \cdot S = \begin{bmatrix} v_{1,1} & v_{1,2} \\ v_{2,1} & v_{2,2} \\ v_{3,1} & v_{3,2} \\ v_{4,1} & v_{4,2} \end{bmatrix} \cdot \begin{bmatrix} p_1 & 0 \\ 0 & p_2 \end{bmatrix} \begin{bmatrix} s_1 \\ s_2 \end{bmatrix},$$

with $$\sum_{j=1}^{Ns} v_{i,j} = 1, \text{ and } \sum_{i=1}^{Ns} p_i = P,$$

P being the total transmit power.

One group of V matrixes may be:

$$V_1 = \begin{bmatrix} 1 & 0 \\ 0 & 1 \\ 0 & 1 \\ 0 & 1 \end{bmatrix}; V_2 = \begin{bmatrix} 0 & 1 \\ 1 & 0 \\ 0 & 1 \\ 0 & 1 \end{bmatrix}; V_3 = \begin{bmatrix} 0 & 1 \\ 0 & 1 \\ 1 & 0 \\ 0 & 1 \end{bmatrix};$$

$$V_4 = \begin{bmatrix} 0 & 1 \\ 0 & 1 \\ 0 & 1 \\ 1 & 0 \end{bmatrix}; V_5 = \begin{bmatrix} 1 & 0 \\ 1 & 0 \\ 0 & 1 \\ 0 & 1 \end{bmatrix} \cdots$$

where $V_1$ means the first antenna transmits the first stream and other antennas together transmit the second stream; $V_2$ means the second antenna transmits the first stream and other antennas together transmit the second stream; and so on.

Figure 10:
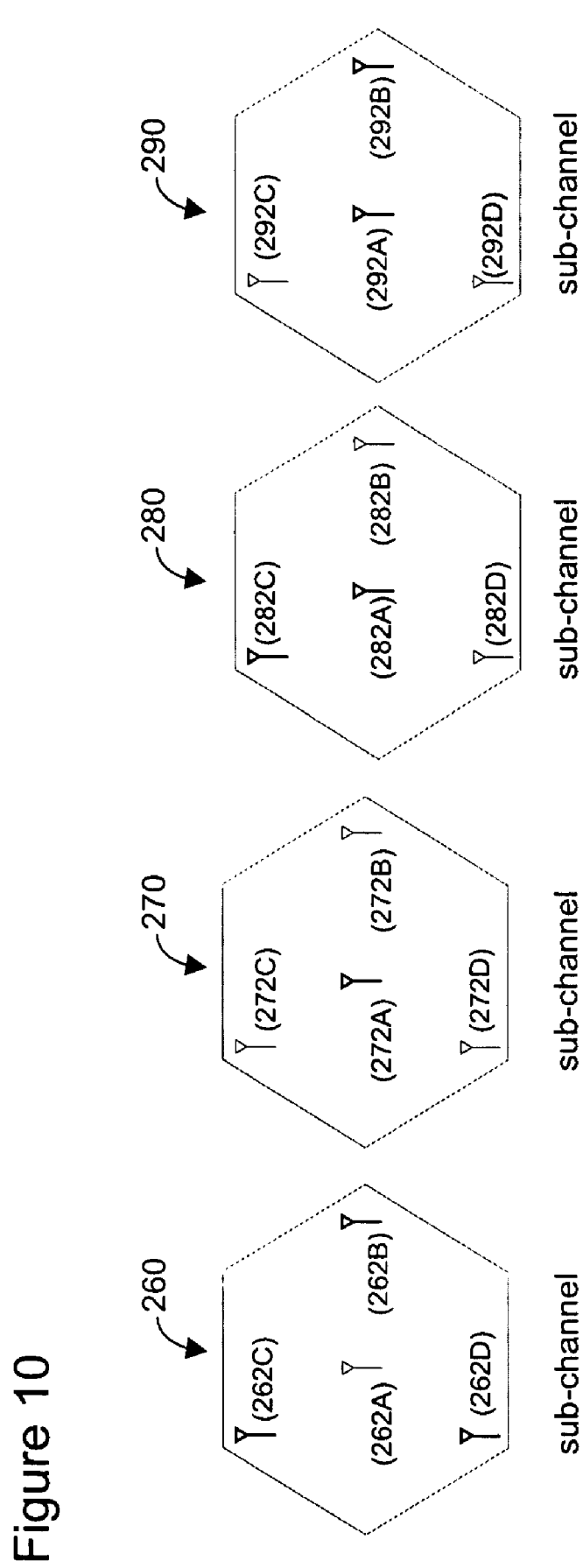
FIG. 10 is a diagram of sub-channels and their antennas, according to some embodiments.

FIG. 10 is a diagram of four sub-channels 260, 270, 280, 290, each with four antennas, according to some embodiments. Sub-channel 260 includes antennas 262A, 262B, 262C, and 262D; sub-channel 270 includes antennas 272A, 272B, 272C, and 272D; sub-channel 280 includes antennas 282A, 282B, 282C, and 282D; sub-channel 290 includes antennas 292A, 292B, 292C, and 292D. Each sub-channel has at least one thick antenna and at least one thin antenna. For example, the sub-channel 270 has one thick antenna 272A and three thin antennas 272B, 272C, and 272D. The sub-channel 290 has two thick antennas 292A and 292B and two thin antennas 292C and 292D. The thin antenna transmits the first stream while the thick antenna transmits the second stream.

Except for the difference of the V matrix, any other part should be the same as for the baseline USM method 400, like receiver, scheduling, CQI feedback, etc.

The USM method 400, using STBC, may also be used in such an architecture. The protocol is the same, except for the change to the V matrix. The adapation strategy is the same.

$N_s > N_n$

Where the number of streams exceeds the number of receiver antennas in the SS, more streams may be supported (more than the receiver antenna number). On the receiver side, because the stream number is larger than the receiver number, the SS is not able to detect all the $N_s$ streams, and therefore has to treat the remaining $N_s$-$N_n$ streams as interference. When the SS estimates the CQI, the interference of the remaining streams is taken into consideration, in some embodiments. The BS may schedule $N_s$ users to one resource block based on the CQI that is fed back from the SS to the BS.

When the number of streams exceeds the number of receiver antennas, in the original centralized antenna structure (see the network topology 230 of FIG. 8), all streams are transmitted from the same position of the antenna sites, and the interference is quite high. With a more distributed antenna structure (such as in the network topology 240 of FIG. 8), some users may be allocated to one resource block, with limited interference.

For example, in a configuration with four streams, and four users, each one close to a different antenna, the interference from other streams (antennas) may be quite low. In this case, four streams may be supported with the USM method 400.

The V matrix is an $N_m \times N_s$ matrix, in which the sum of the rows should be one. An example with a configuration of $N_s=4$, $N_m=4$ is given by the following equation:

$$X = V \cdot S = \begin{bmatrix} v_{1,1} & v_{1,2} & v_{1,3} & v_{1,4} \\ v_{2,1} & v_{2,2} & v_{2,3} & v_{2,4} \\ v_{3,1} & v_{3,2} & v_{3,3} & v_{3,4} \\ v_{4,1} & v_{4,2} & v_{4,3} & v_{4,4} \end{bmatrix} \cdot \begin{bmatrix} p_1 & & & \\ & p_2 & & \\ & & p_3 & \\ & & & p_4 \end{bmatrix} \begin{bmatrix} s_1 \\ s_2 \\ s_3 \\ s_4 \end{bmatrix}$$

In a configuration with four distributed antennas, the stream number may be flexible, and may adapt from one to four streams, according to the channel conditions.

When the stream number is one, the USM method 400 may employ a four-transmitter STBC code (rate 1). When there are two streams, the USM method 400 may employ a four-transmitter stack Alamouti code (rate 2). When there are three streams, the USM method 400 may employ the hybrid mode (one Alamouti code together with two SM). When the stream number is four, the USM method 400 employs a four-stream spatial multiplex.

Simulation Results

Figure 11:
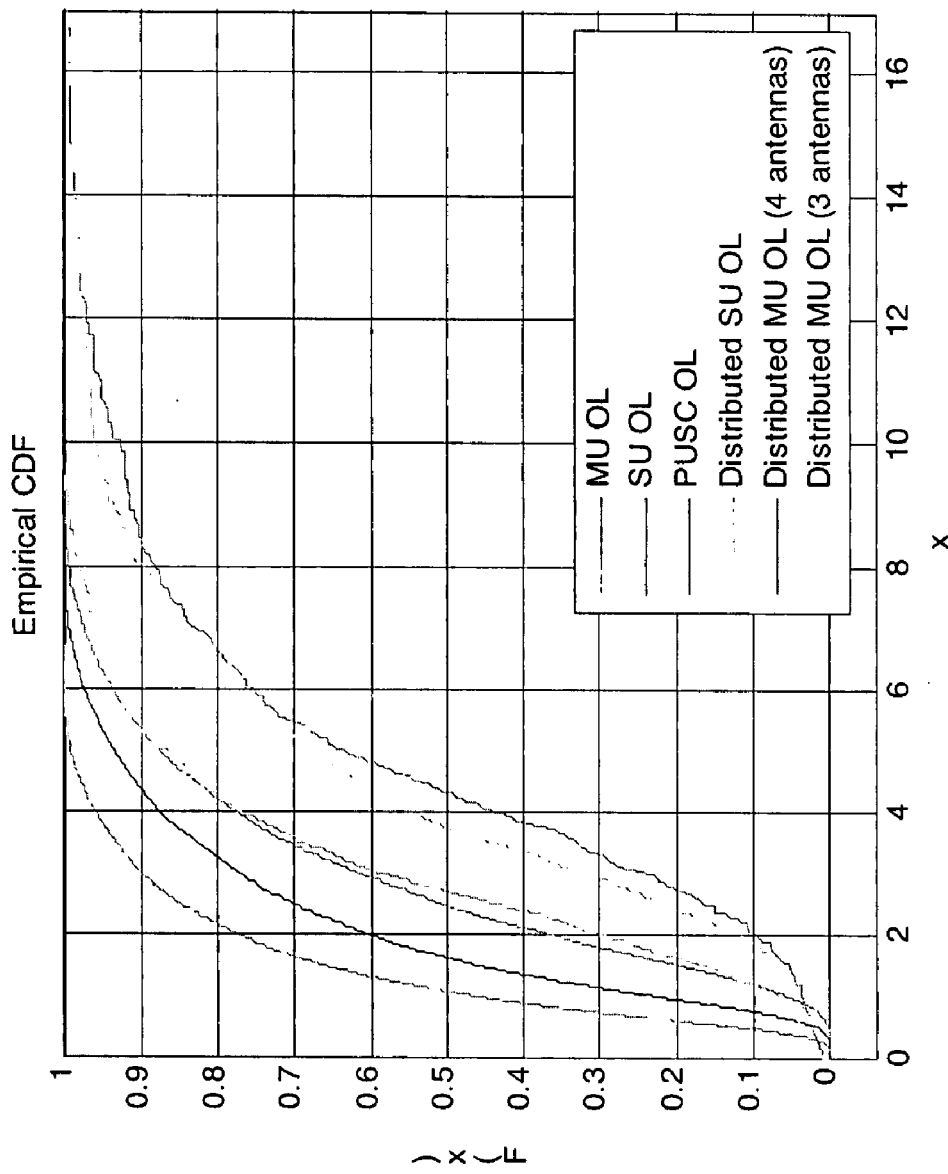
FIG. 11 is a graph illustrating an improvement in user throughput by adopting a multi-user distributed system, according to some embodiments.

Some capacity analysis of the distributed MU-MIMO is showed in the graph 300 of FIG. 11, according to some embodiments. The CQI is calculated (with Shannon capacity used as a metric) for each stream at each sub-channel. The best three CQI results are selected to obtain an average CQI. The distribution of the average CQI is plotted in the graph 300.

Two configurations are considered. First, a configuration with four total antennas, three antennas being distributed to the edge, one at the center, of the cell. Second, a configuration with three total antennas, all of which are distributed at the edge of the cell. FIG. 11 shows the gain of such scenarios is much better than other schemes. The second configuration is a little worse than the first configuration. The USM system 500 and USM method 400 are also valid for the uplink, in some embodiments.

While the application has been described with respect to a limited number of embodiments, those skilled in the art will appreciate numerous modifications and variations therefrom. It is intended that the appended claims cover all such modifications and variations as fall within the true spirit and scope of the above description.

We claim:

1. A system, comprising:
   a base station to generate a uniform scheduler for a plurality of subscriber stations, the base station comprising at least two antennas and the subscriber stations each comprising one or more antennas, the base station further comprising:
      a generator to generate a pre-defined pre-coding matrix, V, comprising a predetermined number of columns, each column corresponding to one of a plurality of spatial streams through which data is transmitted from the base station to the subscriber stations, the pre-coding matrix being either fixed or semi-static with time, wherein the pre-coding matrix, V, is generated using the following discrete Fourier transform:

$$v_m^{(g)} = \frac{1}{\sqrt{M}} \left[ v_{0m}^{(g)} \ldots v_{(M-1)m}^{(g)} \right]^T$$

$$v_{nm}^{(g)} = \exp\left\{ j\frac{2\pi n}{M}\left(m + \frac{g}{G}\right)\right\},$$

where G represents a total number of pre-coding matrixes, g represents an index of the pre-coding matrix, V, from a G matrix, m is a column index of the pre-coding matrix, V, and $v_1, v_2, \ldots, v_{(M-1)m}$ are columns of the pre-coding matrix, V, and M is the total number of spatial streams, the generator further comprising a transmission equation used to generate the pre-coding matrix, V, the transmission equation comprising:

$$\begin{pmatrix} a_0 \\ a_1 \\ \vdots \\ a_{Nm-1} \end{pmatrix} = V_{k,t} \times S^* = (p_0 v_0 \quad p_1 v_1 \quad \cdots \quad p_{Ns-1} v_{Ns-1}) S^*,$$

where $p_i \epsilon [0: Ns-1]'$ is a power-loading factor, and $$\sum_{i=0}^{Ns-1} p_i = P;$$

a feedback channel to receive one or more channel quality indicators for each of the spatial streams, each channel quality indicator comprising an estimate of channel quality by the subscriber stations; and
   a resource block comprising one or more spatial streams, wherein the uniform scheduler schedules one or more subscriber stations to the resource block based on the channel quality indicators fed to the base station.

2. The system of claim 1, wherein the uniform scheduler either schedules multiple subscriber stations to a single spatial stream in the resource block or schedules a single subscriber station to multiple spatial streams in the resource block.

3. The system of claim 1, wherein each of the spatial streams comprises one or more sub-channels, each of which has a different pre-coding matrix.

4. The system of claim 1, the base station further comprising:
   a space-time block to:
      receive the data from the modulation and encoding blocks; and
      perform space-time coding of the data.

5. The system of claim 1, wherein spatial stream number is changed to address a bad channel conditioned subscriber station.

6. The system of claim 1, wherein the one or more channel quality indicators (CQI) are of a type selected from the group consisting of horizontal spatial multiplexing CQI, horizontal spatial multiplexing CQI with serial interference cancellation, and vertical spatial multiplexing CQI, and the type is indicated using either fixed CQI or flexible CQI.

7. The system of claim 1, the base station operating in a multiple-input-multiple-output mode, wherein the multipleinput-multiple-output mode switches between space-time block coding and spatial multiplexing.

8. The system of claim 1, wherein the base station operates in a distributed network, the distributed network comprising a cell with edge antennas and directional antennas.

9. The system of claim 8, wherein the base station operates in the distributed network when the number of spatial streams is less than or the same as the number of antennas in each subscriber station.

10. The system of claim 8, wherein the base station operates in the distributed network when the number of spatial streams exceeds the number of antennas in each subscriber station.

11. A method, comprising:
receiving channel quality indicator information for a plurality of spatial streams by a base station from a plurality of subscriber stations, the base station comprising at least two antennas and the subscriber stations each comprising at least one antenna, each channel quality indicator being an estimate of channel quality by the subscriber station;
generating a pre-defined pre-coding matrix, V, using a transmission equation, the pre-coding matrix, V, comprising a plurality of rows and columns, each column being associated with one of the plurality of spatial streams, the pre-coding matrix being either fixed or semi-static, wherein the number of rows in the pre-coding matrix is equal to the number of antennas in the base station, the transmission equation comprising:

$$\begin{pmatrix} a_0 \\ a_1 \\ \vdots \\ a_{Nm-1} \end{pmatrix} = V_{k,t} \times S^* = \begin{pmatrix} p_0 v_0 & p_1 v_1 & \cdots & p_{Ns-1} v_{Ns-1} \end{pmatrix} S^*,$$

where $p_i i \epsilon [0: Ns-1]'$ is a power-loading factor, and $$\sum_{i=0}^{Ns-1} p_i = P;$$

and
allocating a resource block by the base station based on the received channel quality indicator information;
wherein the base station generates a scheduling algorithm, which either schedules multiple subscriber stations to a single spatial stream in the resource block or schedules a single subscriber station to multiple spatial streams in the resource block.

12. The method of claim 11, generating a pre-coding matrix, V, further comprising:
generating a different pre-coding matrix for each sub-channel of each spatial stream.

13. The method of claim 12, further comprising:
performing a space-time coding of the data, wherein the space-time coding is either regular space-time coding, space-time block coding, spatial multiplexing coding, spatial trellis coding, or a combination of space-time coding types.

14. The method of claim 11, generating a pre-coding matrix, V, further comprising:
executing a discrete Fourier transform equation:

$$v_m^{(g)} = \frac{1}{\sqrt{M}} \left[ v_{0m}^{(g)} \cdots v_{(M-1)m}^{(g)} \right]^T$$

$$v_{nm}^{(g)} = \exp\left\{ j \frac{2\pi n}{M} \left( m + \frac{g}{G} \right) \right\},$$

where G represents a total number of pre-coding matrixes, g represents an index of the pre-coding matrix, V, from a G matrix, m is a column index of the pre-coding matrix, V, and $v_1, v_2, \ldots, v_{(M-1)m}$ are columns of the pre-coding matrix, V, and M is the total number of spatial streams.

15. The method of claim 11, further comprising:
determining a number of spatial streams under either semi-static adaptation, in which the base station and subscriber station agree to a stream number that will be valid for a predetermined time period, or subscriber station-controlled adaptation, in which the subscriber station controls the number of streams.

* * * * *